Figure 1:
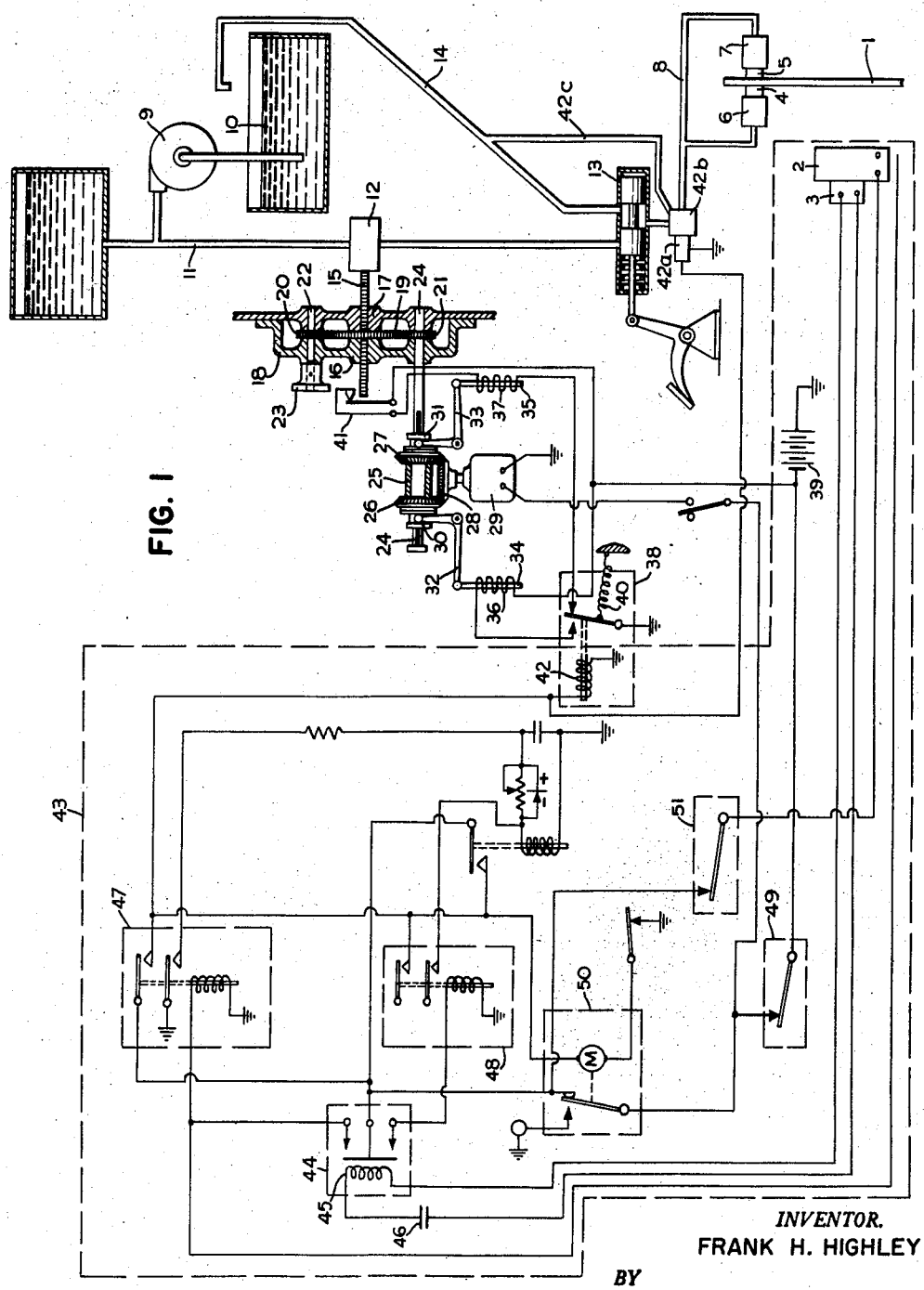

July 12, 1960

F. H. HIGHLEY 2,944,773

MEANS FOR AUTOMATICALLY ADJUSTING
AIRCRAFT BRAKE PRESSURE

Filed Dec. 27, 1956

3 Sheets-Sheet 1

INVENTOR.
FRANK H. HIGHLEY
BY
R. L. Miller
ATTORNEY

INVENTOR.
FRANK H. HIGHLEY
BY
R. L. Miller
ATTORNEY

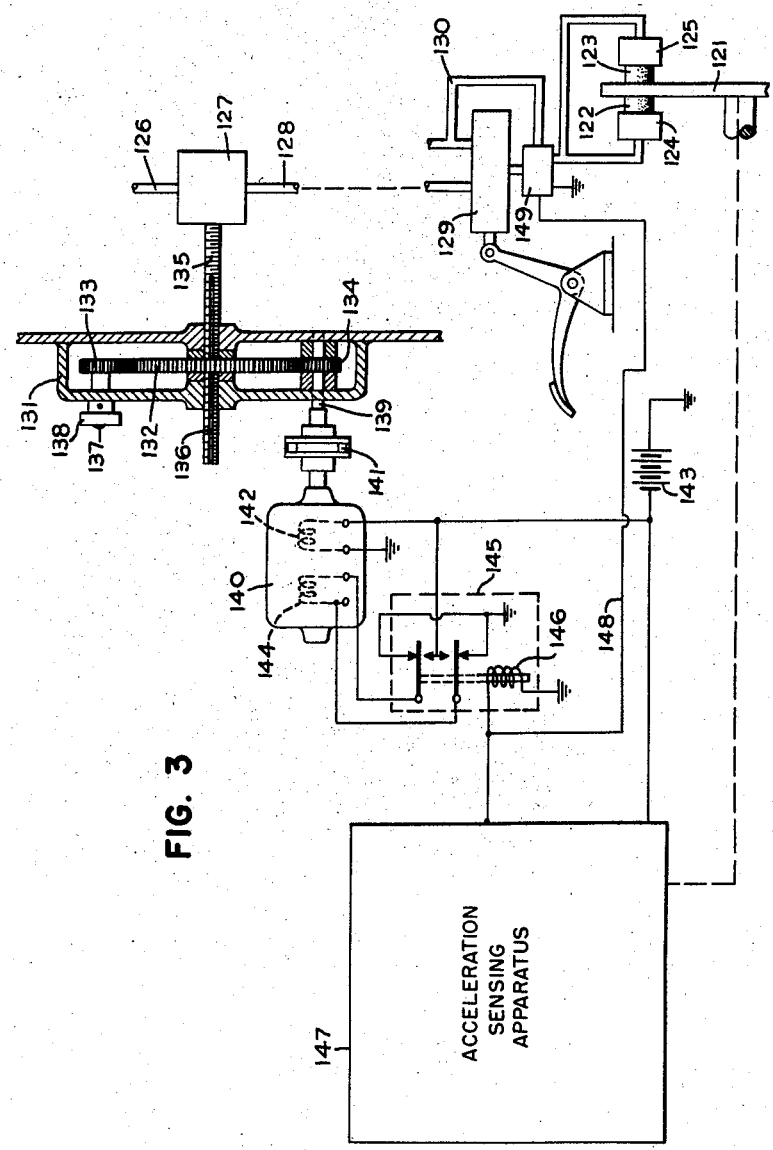

United States Patent Office 2,944,773
Patented July 12, 1960

2,944,773
MEANS FOR AUTOMATICALLY ADJUSTING AIRCRAFT BRAKE PRESSURE

Frank H. Highley, Canton, Ohio, assignor to The Goodyear Tire & Rubber Company, Akron, Ohio, a corporation of Ohio Filed Dec. 27, 1956, Ser. No. 630,838

5 Claims. (Cl. 244—111)

This invention relates to means for automatically adjusting brake pressure and is especially useful in control of hydraulic pressure for braking the landing wheels of aircraft.

In the copending application of Edward T. Armstrong and Frank H. Highley, Ser. No. 622,904, filed November 19, 1956, mechanism has been disclosed to modulate or control the hydraulic pressure available at the brake operating cylinders of aircraft brakes so as to vary in response to speed of the aircraft at all times during a landing or braking run. It is also proposed in that application to provide manual adjustments for weight, lift coefficient, and runway coefficient of friction so as to modulate brake pressure to correspond to the summation of these conditions. Furthermore, the same application proposes to combine such pressure modulating means with means heretofore proposed for interrupting brake application whenever sensing means determine that too rapid deceleration of the wheels indicates danger of a skid. Such brake pressure interrupting means controlled by electrical sensing means is disclosed in the copending application of Mark I. Curl and John Steigerwald, Serial No. 451,812 filed August 24, 1954, now Patent No. 2,850,121.

The present invention combines with the skid-sensing circuit of Curl et al. mechanism controlled thereby for modifying the pressure of the brake operating fluid either alone or in combination with means for sensing the speed of the aircraft.

It is an object of the invention to provide automatic modulation of available fluid pressure at the brakes of aircraft so as to provide the most efficient braking throughout a landing or braking run while at the same time so controlling the brake pressure as to prevent skidding while permitting application of brakes by the operation of the conventional pilot-controlled, pedal operated brake valve.

These and other objects will be apparent from the following description and the accompanying drawings.

Figure 2:
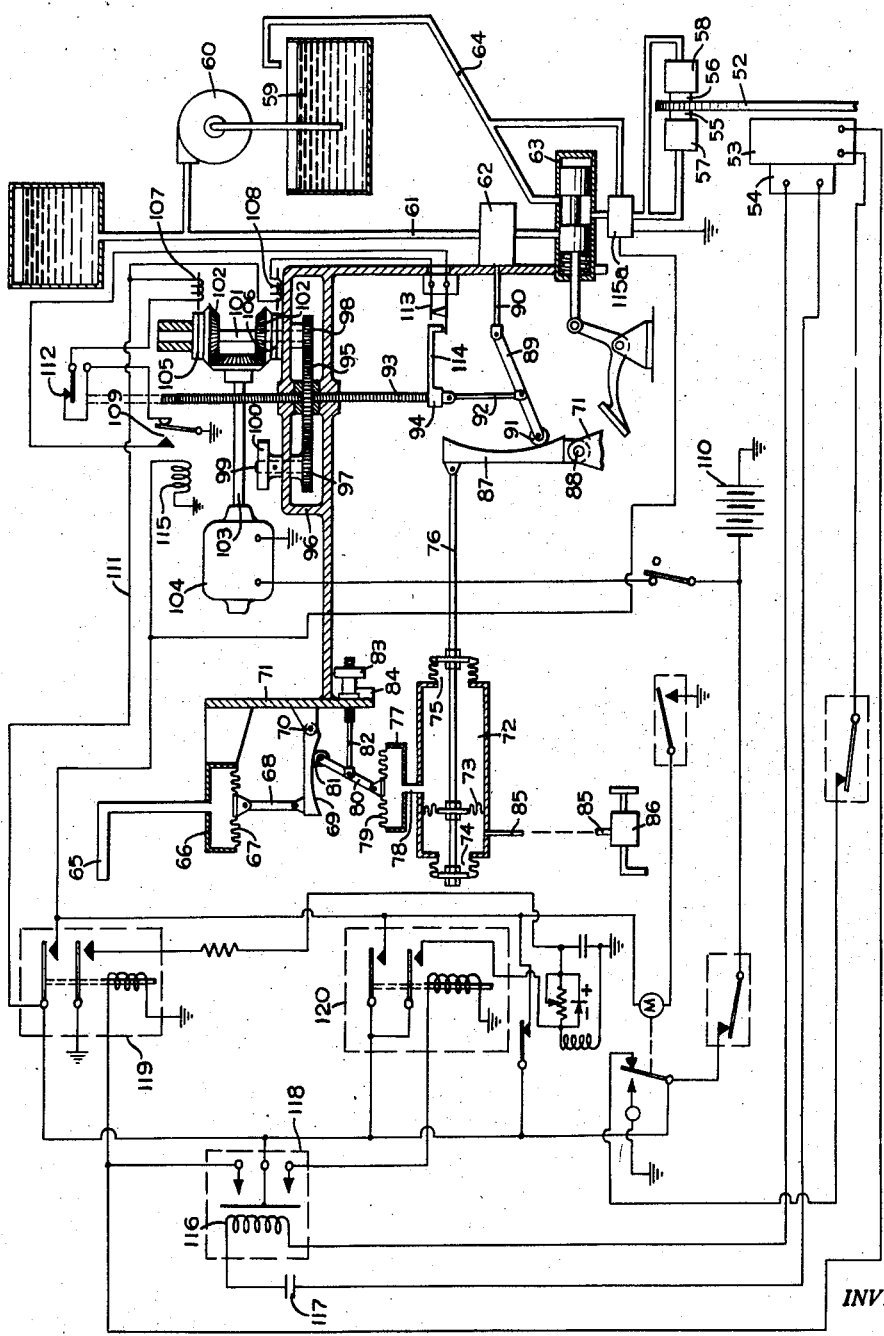

In the drawings:

Fig. 1 is a diagrammatic view of an apparatus constructed according to and embodying the invention, parts of the mechanism being shown in section and parts broken away. In this form of the invention, the brake operating pressure available is modulated by acceleration or deceleration of the landing wheels;

Fig. 2 is a similar view of another form of the invention in which brake operating pressure is modulated in response to speed of the plane and acceleration or deceleration of the landing wheels; and Fig. 3 is a similar view showing another modification of the invention in which pressure for operating the brakes is modulated by acceleration or deceleration of the wheels as sensed by anti-skid means and employing a reversible motor for making the pressure adjustments.

Referring to the drawings, and first to Fig. 1 thereof, the numeral 1 designates a brake disc rotatably carried by a landing wheel (not shown) which also drives a D.C. generator 2 and a normally closed centifugal switch 3 adapted to be opened at a speed of about twenty-five miles per hour. A pair of brake shoes or linings 4, 5 and mounted at opposite sides of the disc 1 in operating cylinders 6, 7 and are supplied with operating fluid through a line 8.

A pump 9 is adapted to draw operating fluid from a reservoir 10 and deliver it through a line 11 to line 8 by way of a pressure regulating valve 12 and a pilot-controlled, pedal operated valve 13 of a conventional type normally used in airplane power brake systems. Diagrammatically the valve 13 is shown as being a three-way valve having an exhaust line 14 which returns fluid from the brake cylinders to the reservoir 10.

For regulating the fluid pressure, the valve 12 has a pressure adjusting rod in the form of a threaded spindle 15 which extends through spaced aligned bearings 16, 17 of a gear case 18. A gear 19, confined within the case 18 has a threaded bore for engaging the spindle 15.

Two pinions 20, 21 are provided within the gear case and mesh with gear 19. Pinion 20 is fixed to a shaft 22 extending through aligned bearings of the gear case and has a knob 23 secured thereto for manual adjustment of valve 12. Pinion 21 is fixed to a shaft 24 which extends through aligned bearings of the gear case and also through a bearing 25. A pair of miter gears 26, 27 are mounted for free rotation on shaft 24 and mesh with a miter gear 28 driven by a D.C. motor 29. A pair of clutches 30, 31 are slidably mounted on splines of shaft 24 for engaging gears 26, 27 respectively.

For alternately operating the clutches, a pair of bell cranks 32, 33 are pivotally mounted on a stationary frame member. Each bell crank has a shifter fork on one arm for operating one of said clutches and an armature at its other arm. The armatures 34, 35 being adapted to be operated by solenoids 36, 37 respectively. For operating the solenoids, a solenoid operated relay 38 is provided of the single pole double throw type, and a D.C. voltage source 39 is also provided. The movable contact of relay 38 is normally held by a spring 40 so as to close a circuit including the voltage source 39 solenoid 37 and a normally closed limit switch 41 thereby energizing solenoid 37 and engaging clutch 31. This causes threaded rod 15 to move axially to the left opening valve 12, to a position where it provides the greatest pressure, and with the end of rod 15 finally engaging limit switch 41 to open it at maximum pressure. The motor 29 is also powered by source 39 and runs continuously. Opening of limit switch 41 disengages clutch 31.

Now, should solenoid 42 of relay 38 be energized, it will throw the movable contact to the left against spring 40 energizing solenoid 36 and engaging clutch 30, thereby adjusting valve 12 to reduce fluid pressure at the brakes.

For operating the solenoid 42, it is proposed to employ any known anti-skid means which energize the solenoid 42 whenever the plane is travelling at over twenty-five miles per hour on a landing field and its brake controlled landing wheel is decelerating at a rate sufficiently greater than the airplane to indicate a skid is developing. One such anti-skid means is shown and described in the Curl and Steigerwald application Serial No. 451,812 and is here designated by the numeral 43 and includes the generator 2, centrifugal switch 3, power source 39 and solenoid 42 heretofore referred to. Such a circuit includes a neutral polarized relay 44, the solenoid 45 of which is in series with generator 2 and a capacitor 46 so that solenoid 45 is energized only when the landing wheel is rapidly accelerating or decelerating beyond an acceptable rate. Energizing of the solenoid 45 causes relay 44 to energize either relay 47 or 48. Energizing of either 47 or 48 closes its contacts thereby energizing solenoid 42 of relay 38. Between the power source 39 and the middle or hot contacts of relays 44, 47 and 48 is a limit switch 49 normally open which closes when the landing gear of the plane is lowered, and a fail-safe time delay relay 50 adapted to open the power circuit in three seconds of current flow through the solenoids indicating sticking of contacts. Limit switch 51 is also provided. It is mounted on the retractible landing gear, is normally closed and opens when three fourths of the load of the plane is on the wheels.

Positioned in the line 8 is an anti-skid valve 42b which is normally open, but which when operated by solenoid 42a closes to relieve brake pressure on the disc 1. The solenoid 42a is connected in parallel with solenoid 42 as shown so that when the skid sensing means 43 operates to indicate a skid is developing the valve 42b is closed to cut off hydraulic pressure to the brake cylinders 6 and 7 and the pressure thereon is relieved back to reservoir 10 by conduit 42c.

In the operation of the apparatus of Fig. 1, the valve 12 is normally positioned to pass hydraulic fluid under a pressure which will brake the brakes up to a maximum braking effort without causing skidding. Thus, when the pilot applies the brake by operating valve 13, the pressure allowed to pass by valve 12 is applied to the brakes. But should this pressure be too great and the wheel decelerate too rapidly at a speed over twenty-five miles per hour, solenoid 42 is energized and to operate relay 38, energize solenoid 36 and engage clutch 30. This causes rotation of gear 19 thereby adjusting valve 12 to reduce the pressure of the brake operating fluid. Energizing solenoid 42 likewise energizes solenoid 42a and valve 42b to effect the release of pressure at the brake and allow the wheel to recover speed. Upon recovery of wheel speed solenoids 42 and 42a are de-energized to open valve 42b permitting normal braking. The contact of solenoid 38 is then moved by spring 40 to energize solenoid 37 engaging clutch 31 and adjusting valve 12 to a more open position. In other words, in the mechanism of the system as described, motor 29 is operating to increase or decrease the pressure passed by valve 12, always hunting for the maximum effective braking pressure without skidding. If skidding repeatedly occurs, the valve 12 is progressively repositioned to pass less pressure until skidding stops. If there is no skidding upon brake operation, the valve 12 is progressively opened to pass more pressure until such time as skidding occurs. In this way, and regardless of conditions of runway, weight of airplane, temperature, and other variables, the braking system is always seeking maximum braking action short of skidding. Time delay means can be associated with either solenoid 36 or 37 to delay operation or recovery thereof to assist in the balancing of the hunting adjustment described. The result is a reduction in the brake on-brake off cycling of the usual anti-skid mechanism.

Now referring to Fig. 2, a rotatable brake disc 52 is carried by a wheel (not shown) which also carries a D.-C. generator 53 and a normally closed centrifugal switch 54. Brake shoes or linings 55, 56 are adapted to be advanced against the disc by cylinders 57, 58. Pressure fluid is pumped from a reservoir 59 by a pump 60 and supplied to a line 61 and thence to the brake cylinders by way of a pressure regulating valve 62 and a pilot-controlled three-way valve 63. An exhaust line 64 returns fluid to the reservoir.

The purpose of valve 62 is to modulate the pressure applicable to the brake. This pressure, in the absence of rapid deceleration of the wheel indicating skidding or rapid acceleration of the wheel, should follow a pattern depending upon speed of the vehicle but modulated by lift and runway coefficients, and weight of the plane. To accomplish this, a pivot head 65 is mounted on the plane and is connected to a capsule 66 having a diaphragm 67. A strut 68 connects the diaphragm to a cam lever 69 pivoted at 70 to the stationary frame 71. A chamber 72 is provided with a flexible diaphragm partition 73 dividing it into two cells. Each cell is connected to an expandible pocket 74 and 75 provided by bellows walls. A rod 76 connects the end walls of the pockets 74, 75 and the diaphragm 73. A capsule 77 is connected to one cell of the chamber 72 by a pipe 78 and terminates in a flexible diaphragm 79. A strut 80 has one end pivoted to the center of diaphragm 79 and has a roller 81 at its opposite end engaging the cam lever 69. Pivoted to the center of strut 80 is a threaded adjusting rod 82 which extends through the stationary frame 71 and is engaged by an adjusting nut 83 retained on the frame by a keeper 84. The rod 82 provides for manual adjustment to modify the multiplying factor of the speed sensing mechanism according to the lift coefficient of the plane.

The smaller cell of chamber 72 is connected by a pipe 85 to a source of constant air pressure through a pressure regulating valve 86. Valve 86 may be manually adjusted to correct for gross weight of the plane.

Rod 76 is pivotally connected to the face end of a cam lever 87 pivoted at 88 to frame 71. A strut 89 is pivotally connected to the operating stem 90 of pressure regulating valve 62. The opposite end of strut 89 carries a roller 91 engaging cam lever 87. The center of strut 89 is connected by a link 92 to a threaded adjusting rod 93 by a swivel connection 94 for modifying the adjustment of valve 62 when the sensing mechanism indicates excessive deceleration indicating a skid condition, and/or to get a maximum braking effort.

For adjusting the rod 93, a gear 95 having a threaded bore is confined axially in a gear case 96 which also contains a pair of pinions 97, 98. Pinion 97 is fixed to a shaft 99 to which is secured a knob 100 whereby the pinion may be turned to adjust the gear manually, for example, to put a runway friction coefficient into the mechanism. Pinion 98 is fixed to a shaft 101 on which are rotatably mounted a pair of miter gears 102.

A third miter gear meshes with the others and is fixed to a shaft 103 of a motor 104. Gears 102 may be clutched to shaft 101 selectively by magnetic clutches 105, 106 operated respectively by solenoids 107, 108. For operating the clutches, a single pole double throw relay 109 is provided. Likewise provided is a current source 110, one side of which is grounded and the other terminal of the source 110 is connected through a line 111 with one side of each solenoid 107, 108, the remaining ends of the solenoids connecting to the fixed contacts of relay 109. The movable contact of relay 109 is grounded.

A normally closed limit switch 112 is in the circuit of solenoid 107 and is physically opposite the end of rod 93 so as to be opened by the end of the movement of said rod toward it. Motor 104 is connected in circuit with current source 110. A normally closed limit switch 113 is in the circuit of solenoid 108 and is physically in the path of an arm 114 attached to rod 93. The movable contact of relay 109 is normally in the position shown to permit energizing of solenoid 107. Thus, assuming limit switch 112 closed, the rod 93 would be raised until limit switch 112 opens to a position where the movement of rod 76 would effect the greatest opening movement upon valve 62. Now should solenoid 115 of relay 109 be energized, clutch 106 would be engaged, moving rod 93 to the down position shown in Fig. 2 where the movement of rod 76 would effect the least opening movement upon valve 62. At extreme movement in that direction, limit switch 114 would be opened, stopping such movement.

For operating relay 109, any known anti-skid mechanism, such as that of Curl et al., Ser. No. 451,812, may be employed. For this purpose, the D.-C. generator 53 driven by the braked wheel is placed in series with a neutral polarized relay solenoid 116 and a capacitor 117 so that current flows in solenoid 116 only when the wheel is accelerating or decelerating at excessive rates, for example, beyond the normal deceleration of the aircraft thereby indicating that a skid is developing, at which time the relay 118 energizes either relay 119 or 120, in either case, energizing solenoid 115 and closing anti-skid shut off valve 115a which relieves brake pressure.

In the apparatus embodiment of Fig. 2, the supply of pressure fluid to the brake is further controlled by the pilot-operated valve 63. The pressure of such supply is normally primarily regulated by valve 62. This pressure is controlled as follows:

The valve 86 is adjusted to the proper setting for the weight of the plane. The adjusting nut 83 is set to the lift coefficient of the plane. The resultant of combining these adjustments with the pressure developed from the pitot head (speed of the airplane) is applied to rod 76. The effect of this force upon the pressure regulating valve 62 is further modified by adjustment of rod 93 which depends upon the skid sensing circuit since with a skid developing, solenoid 115 and clutch 108 are energized, cause movement of rod 93 to reposition strut 89 and cam lever 87 to reduce the pressure passed by pressure regulating valve 62, thereby reducing pressure of the brake operating fluid so that when the brakes are reapplied there will be less tendency to skid. Of course, and as aforesaid, when solenoid 115 is energized as a result of a skid then valve 115a is likewise shut off to relieve brake pressure. The release of brake pressure de-energizes solenoid 115, opens valve 115a and activates clutch 107 to drive rod 93 to reposition strut 89 and cam lever 87 to increase the pressure passed by valve 62. Thus, the mechanism described is always hunting for the most effective braking pressure just short of skidding. Time delay means can be incorporated with solenoid 115 to delay operation or release to best effect this desired action.

The modification shown in Fig. 3 is similar to that of Fig. 1 except that a reversible motor is employed in place of the motor and reversing clutch mechanism of Fig. 1. In this form of the invention, referring to the drawing, the numeral 121 designates a rotatable brake disc carried by a landing wheel (not shown). Brake shoes or liners 122, 123 are provided for engaging the brake disc and are operated by cylinders 124, 125. Brake operating fluid under constant pressure is supplied by a line 126. The pressure from this line is controlled by a pressure regulating valve 127 and the fluid is supplied through a line 128 therefrom to a pilot controlled three-way valve 129. The valve 129 normally connects the cylinders 124, 125 with an exhaust line 130 shutting off the supply line 128.

For operating the pressure regulating valve 127, a gear case 131 is provided having a gear 132 and pinions 133, 134 in meshing relation thereto. Gear 132 has a threaded bore for engaging a threaded rod 135. The rod has a longitudinal key-way 136 and is slidably but non-rotatably mounted through walls of the gear case. Pinion 133 is fixed to a stub shaft 137 having a knob 138 secured thereto whereby the gears may be rotated by hand to initially adjust the valve 127, for example, to runway coefficient of friction.

Pinion 134 is mounted on a shaft 139 journalled in the case and connected to the shaft of a reversible motor 140 by a coupling 141.

Motor 140 has a constantly energized field winding 142 in series with a power source 143 and an armature winding 144 controlled by double pole double throw switch 145. Switch 145 is operated by a solenoid 146. In one position of the switch 145, the motor 140 is driven in one direction and in the other position of the switch, as when solenoid 146 is operated, the motor 140 is driven in the reverse direction.

For controlling the solenoid 146, the same circuit is employed as that used to control solenoid 42 of the apparatus of Fig. 1 and is accordingly diagrammatically indicated as box 147, labeled "Acceleration Sensing Apparatus." A lead 148 extends from the solenoid 146 to a solenoid operated shut-off valve 149 positioned in the brake conduit so that substantially simultaneously with the operation of solenoid 146 to operate switch 145, the valve 149 is shut off relieving brake pressure.

Thus, the operation of the form of the invention of Fig. 3 is the same as that of Fig. 1 except that Fig. 3 utilizes a reversing motor 140 instead of a one-way motor 29 and oppositely directing clutches.

While certain representative embodiments and details have been shown for the purpose of illustrating the invention, it will be apparent to those skilled in this art that various changes and modifications may be made therein without departing from the spirit or scope of the invention.

What is claimed is:

1. Apparatus for automatically adjusting pressure of brake operating fluid applied to a brake operating cylinder of a landing wheel brake of an aircraft, said apparatus comprising a constant pressure source of brake operating fluid, a pilot-controlled valve connected between said constant pressure source and said brake operating cylinder for controlling supply of such fluid to the brake cylinder, a pressure regulating valve connected to said constant pressure source for controlling pressure of fluid supplied to said brake cylinder, sensing means associated with said wheel for sensing excessive deceleration of the wheel, and forward and reverse means connected to said pressure regulating valve to increase or decrease the pressure passed thereby and controlled by said sensing means to continuously readjust the pressure at the brake operating cylinder in accordance with the output of said sensing means so as to establish automatically substantially the maximum braking force just short of excessive wheel deceleration.

2. Apparatus for automatically adjusting pressure of brake operating fluid applied to a brake operating cylinder of a landing wheel brake of an aircraft, said apparatus comprising a constant pressure source of brake operating fluid, a pilot-controlled valve connected between said constant pressure source and said brake operating cylinder for controlling supply of such fluid to the brake cylinder, a pressure regulating valve connected to said constant pressure source for controlling pressure of fluid supplied to said brake cylinder, sensing means associated with said wheel for sensing excessive deceleration of the wheel, means associated with the aircraft for determining speed of the aircraft, means for combining the outputs of said deceleration sensing means and said speed determining means, and means associated with said regulating valve and controlled by the combined outputs of said sensing means and said speed determining means to regulate pressure at the brake operating cylinder in accordance with the combined outputs.

3. Apparatus for automatically adjusting pressure of brake operating fluid applied to a brake operating cylinder of a landing wheel brake of an aircraft, said apparatus comprising a constant pressure source of brake operating fluid, a pilot-controlled valve connected between said constant pressure source and said brake operating cylinder for controlling supply of such fluid to the brake cylinder, a pressure regulating valve connected to said constant pressure source for controlling pressure of fluid supplied to said brake cylinder, sensing means associated with said wheel for sensing excessive deceleration of the wheel, means associated with the aircraft for determining speed thereof, means adjustable by the pilot for modulating the output of said speed determining means for different lift coefficients of the aircraft, means for combining the modulated output of the speed determining means and the output of said deceleration sensing means and means associated with said regulating valve and controlled by the combined outputs of said sensing means and said modulated speed determining means to regulate pressure at the brake operating cylinder in accordance with the combined outputs.

4. Apparatus for automatically adjusting pressure of brake operating fluid applied to a brake operating cylinder of a landing wheel brake of an aircraft, said apparatus comprising a constant pressure source of brake operating fluid, a pilot-controlled valve connected between said constant pressure source and said brake operating cylinder for controlling supply of such fluid to the brake cylinder, a pressure regulating valve connected to said constant pressure source for controlling pressure of fluid supplied to said brake cylinder, sensing means associated with said wheel for sensing excessive deceleration of the wheel, means associated with the aircraft for determining speed thereof, means adjustable by the pilot for modulating the output of said speed determining means for different runway friction coefficients of the aircraft, means for combining the modulated output of the speed determining means and the output of said deceleration sensing means and means associated with said regulating valve and controlled by the combined outputs of said sensing means and said modulated speed determining means to regulate pressure at the brake operating cylinder in accordance with the combined outputs.

5. Apparatus for automatically adjusting pressure of brake operating fluid applied to a brake operating cylinder of a landing wheel brake of an aircraft, said apparatus comprising a constant pressure source of brake operating fluid, a pilot-controlled valve connected between said constant pressure source and said brake operating cylinder for controlling supply of such fluid to the brake cylinder, a pressure regulating valve connected to said constant pressure source for controlling pressure of fluid supplied to said brake cylinder, sensing means associated with said wheel for sensing excessive deceleration of the wheel, means associated with the aircraft for determining speed thereof, means adjustable by the pilot for modulating the output of said speed determining means for different aircraft weights of the aircraft, means for combining the modulated output of the speed determining means and the output of said deceleration sensing means and means associated with said regulating valve and controlled by the combined outputs of said sensing means and said modulated speed determining means to regulate pressure at the brake operating cylinder in accordance with the combined outputs.

References Cited in the file of this patent
UNITED STATES PATENTS

| | | |
|---|---|---|
| 2,574,426 | Trevaskis | Nov. 6, 1951 |
| 2,635,152 | Dyche | Apr. 14, 1953 |
| 2,753,017 | Curl et al. | July 3, 1956 |